United States Patent
Wisbrun

(10) Patent No.: US 10,964,214 B2
(45) Date of Patent: Mar. 30, 2021

(54) OPTIMUM TEMPERATURE CONTROL DURING PARKING

(71) Applicant: Bayerische Motoren Werke Aktiengesellschaft, Munich (DE)

(72) Inventor: Richard Wisbrun, Ottobrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/504,492

(22) Filed: Jul. 8, 2019

(65) Prior Publication Data

US 2019/0333385 A1    Oct. 31, 2019

Related U.S. Application Data

(63) Continuation of application No. PCT/EP2018/054712, filed on Feb. 26, 2018.

(30) Foreign Application Priority Data

Mar. 15, 2017   (DE) .................. 10 2017 204 271.0

(51) Int. Cl.
| | |
|---|---|
| G08G 1/14 | (2006.01) |
| B60W 10/26 | (2006.01) |
| G01C 21/34 | (2006.01) |

(52) U.S. Cl.
CPC ............ *G08G 1/143* (2013.01); *B60W 10/26* (2013.01); *G01C 21/3469* (2013.01); *G08G 1/144* (2013.01); *G08G 1/146* (2013.01); *B60W 2510/246* (2013.01)

(58) Field of Classification Search
CPC ........ G08G 1/143; G08G 1/144; G08G 1/146; B60W 10/26; B60W 2510/246; G01C 21/3469
See application file for complete search history.

(56) References Cited

U.S. PATENT DOCUMENTS

| | | | |
|---|---|---|---|
| 2005/0280555 A1* | 12/2005 | Warner, IV | ............. G08G 1/14 340/932.2 |
| 2015/0217754 A1* | 8/2015 | MacNeille | ............ B60W 10/26 701/22 |
| 2015/0369613 A1 | 12/2015 | Stadler | |
| 2017/0046957 A1 | 2/2017 | Joerdens | |
| 2017/0327125 A1 | 11/2017 | Nordbruch | |
| 2018/0194343 A1 | 7/2018 | Lorenz | |

(Continued)

FOREIGN PATENT DOCUMENTS

| | | |
|---|---|---|
| DE | 10 2009 027 543 A1 | 1/2011 |
| DE | 10 2013 001 308 A1 | 7/2014 |

(Continued)

OTHER PUBLICATIONS

International Search Report (PCT/ISA/210) issued in PCT Application No. PCT/EP2018/054712 dated Jun. 1, 2018 with English translation (four (4) pages).

(Continued)

*Primary Examiner* — Amine Benlagsir
(74) *Attorney, Agent, or Firm* — Crowell & Moring LLP

(57) ABSTRACT

A method collectively and yet individually assesses a parking area and locates a parking space which is energy-optimized with respect to a temperature control. A correspondingly equipped parking system carries out the method.

12 Claims, 2 Drawing Sheets

(56) References Cited

U.S. PATENT DOCUMENTS

2019/0130747 A1* 5/2019 Kurotobi ............... B60W 30/06
2019/0259277 A1* 8/2019 Dudar ................ B62D 15/0285

FOREIGN PATENT DOCUMENTS

| DE | 10 2014 224 108 A1 | 6/2016 |
| DE | 10 2014 001 554 B4 | 7/2016 |
| EP | 3 130 893 A1 | 2/2017 |

OTHER PUBLICATIONS

German-language Written Opinion (PCT/ISA/237) issued in PCT Application No. PCT/EP2018/054712 dated Jun. 1, 2018 (seven (7) pages).

German-language Search Report issued in counterpart German Application No. 10 2017 204 271.0 dated Oct. 24, 2017 with partial English translation (12 pages).

* cited by examiner

OPTIMUM TEMPERATURE CONTROL DURING PARKING

CROSS REFERENCE TO RELATED APPLICATIONS

This application is a continuation of PCT International Application No. PCT/EP2018/054712, filed Feb. 26, 2018, which claims priority under 35 U.S.C. § 119 from German Patent Application No. 10 2017 204 271.0, filed Mar. 15, 2017, the entire disclosures of which are herein expressly incorporated by reference.

BACKGROUND AND SUMMARY OF THE INVENTION

The invention relates to a method for collectively and yet individually rating a parking area and finding a parking space that is energy-optimized with regard to climate conditioning. Further, the present invention relates to an accordingly configured parking system. On top of that, a computer program product having control commands that implement the method and operate the proposed parking system is proposed.

DE 10 2014 001 554 B4 discloses an autonomous vehicle that takes the vehicle interior temperature and the expected time of arrival of the driver as a basis for independently choosing a parking space that results in an optimum interior temperature of the vehicle.

DE 10 2009 027 543 A1 discloses a method in which buildings and the position of the sun are taken as a basis for calculating the likely shadow pattern and this is visually indicated to the driver.

DE 10 2013 001 308 A1 discloses a method for providing information about a parking space. The invention also includes a navigation apparatus by means of which this information is made available to a driver of a motor car.

DE 10 2014 224 108 A1 discloses a method for operating a vehicle, wherein one or more vehicle components of the vehicle are operated on the basis of a prescribed time of collection of the vehicle at a collection position in a carpark such that the vehicle at the collection position has one or more prescribed states at the prescribed time of collection.

Saving energy has been an important factor in the development of vehicles for a long time. In the case of electric vehicles, however, intelligent energy management is even more important, because the range and hence the benefit to the customer can be increased directly. A fundamental component of this is temperature management in the vehicle interior.

The prior art shows detection of features of an individual parking space or static reading of previously stored features. When individual parking spaces are processed, over-specification can occur, however. Weather data typically relate to areas and hence it is disadvantageous to severely restrict the parking space search just to the local area.

It is an object of the present invention to provide an improved method that allows collective and yet individual rating of a parking area and finding of an energy-optimized parking space with little technical outlay. Further, it is an object of the present invention to provide an accordingly configured system arrangement and to provide a computer program product having control commands that implement the method and at least partially operate the proposed system arrangement.

Accordingly, a method for optimum climate conditioning when parking is proposed, involving specifying a parking area and a parking time, wherein the method is characterized in that there is provision for providing parking area information by way of a plurality of vehicles that are in this parking area in a period that comprises the parking time, and selecting a parking space within the parking area on the basis of vehicle parameters.

In the text that follows, aspects are sometimes depicted with reference to electrically operated vehicles, but this is not intended to be interpreted as limiting. Rather, the present invention is aimed generally both at electric vehicles and at vehicles having an internal combustion engine. In this respect, motor vehicles are generally developed further according to the invention. Suitable motor vehicles in this case are generally any motor vehicle, in particular an automobile.

According to the invention, it is possible to use an electrically operated vehicle to select a parking space such that energy consumption is optimized. As such, a battery does not simply power the air conditioning system, rather the applicable range of the electric vehicle also decreases when the air conditioning system is operated. In this regard, the driver can specify, for example by use of an application appliance, where he wishes to park and can optionally select a parking time. If a driver enters no parking time, then the current time can be set as standard or the route guidance is used to calculate when the vehicle will reach the destination area. It is therefore thus possible for the driver to select a complete road, a city zone or else a radius around a fixed point as a parking area. Therefore, it is thus not just possible to select individual parking spaces, but rather an entire area can be narrowed, which in turn increases the likelihood of a particularly suitable parking space being found.

It may thus be advantageous to travel further for an energy-optimized parking space rather than choosing a closer parking space that has unfavorable energy properties. An unfavorable energy property in this case is for example excessive heat or insolation in summer. By contrast, this is particularly advantageous in winter, since the vehicle needs to be heated less after a parking process. The same applies to the battery of an electric vehicle, which first needs to be brought to an operating temperature after parking.

It is therefore thus also possible to specify what form the parking space needs to take on the basis of the parking time. Therefore, it is also possible to take into consideration times of day and to take into consideration applicable weather conditions at the time of day. Since the weather can change quickly, a solution is proposed in the present case that is based on providing parking area information by means of multiple vehicles. Therefore, the specified areas are thus particularly advantageously rated, since the weather in such areas is typically always the same. On top of that, it is also possible for parking-space-individual features, such as for example a wind flow or a presence of buildings, to be taken into consideration. A building affects a parking space such that it results in shade and a particular wind behavior.

The parking area information can be provided by means of multiple vehicles that are either parked in the parking area or driving through it. This too can in turn accomplish rating of the applicable parameters, since a vehicle becomes particularly hot especially when parking. If just an ambient temperature is needed, then the measurement results from traveling vehicles can also be evaluated. Further, it is possible for other vehicles to provide route information and hence to specify that they will shortly be traveling and parking in the parking area. Therefore, the period can be used to set how current the information needs to be and, if need be, to provide expiry information. It is therefore possible for example for just data that are not more than 5 hours to be taken into consideration. As such, for example a wind is highly temporary weather that is no longer relevant if it took place on the day before.

A parking space can be selected on the basis of both provided vehicle parameters and other vehicles and vehicle parameters of the driver's own, searching vehicle. As such, applicable logic may be present that takes into consideration the provided vehicle parameters and compares its own, measured vehicle parameters against these. As such, a convertible with the top open heats up less than a closed vehicle. If the interior temperature thus needs to be optimized when parking, it is thus possible to take into consideration only those vehicles that are closed. If the vehicle looking for the parking space is a convertible, it is accordingly also possible to take into consideration parking area information from convertibles. Generally, vehicles can typically detect whether it is raining, and hence this information can be rated separately for a convertible. Since, according to the present invention, the ambient information is provided by a multiplicity of vehicles (subsequently referred to as a crowd), it is particularly advantageous that many different vehicle types can be taken into consideration. This affords the advantage over known methods that not every single parking space needs to be evaluated individually, because the IT system finds rules for how the weather influence is comparable for different designs of vehicles. As such, it is possible to filter out from the multiplicity of data whether a parking space is actually relevant. If for example an electrically operated vehicle is not supposed to become particularly hot, then it is already possible for all parking spaces or an area of parking spaces with a high level of heat to be filtered out.

This affords the advantage that efficient data processing can take place on the basis of both historic data in the form of a location-based and time-of-day-based model and real-time data. Over the entire duration of the observation history, the system uses the sum of all individual measurements to build up general information concerning the temperature and sequence of insolation for every parking space environment and every vehicle orientation. It is not just particularly advantageous that a multiplicity of actually measured data are available, but rather individual vehicle parameters can be taken into consideration and hence it is not just possible for the location of the parking space to be taken into consideration, but rather any vehicle per se can also be taken into consideration. In this case, it is particularly advantageous for the vehicle data of the searching vehicle also to be taken into consideration. If this is for example a car having an internal combustion engine, then this car has greater capacities for cooling a vehicle interior and does not need to bring a battery to an operating temperature. It is therefore thus possible for vehicle parameters of an electrically operated vehicle to be rated differently than data of a vehicle having an internal combustion engine. It is therefore thus possible for different information that does not appear relevant to be hidden from the existing database.

Using the collected data, the system provides the driver or the autonomous vehicle with a forecast of the optimum parking space in order to increase the energy efficiency of the vehicle for the customer. This is effected by means of the parking spot and the angle at which the vehicle is parked on the road. This passively controls the temperature of the vehicle, for example by virtue of the effect of weather such as shaded insolation, wind tunnels or vegetation effects. The suitable choice of parking space is derivable therefrom. This is therefore advantageous for the driver's cab, inter alia, and the air conditioning system is then relieved of load.

This has a similarly advantageous effect on the batteries in electric vehicles. Vehicle batteries have an optimum temperature range for their operation. To keep the battery in this temperature range, it needs to be heated or cooled, which can be optimized by means of the suitable parking space. All exposed components are open to the UV of insolation. If the insolation intensity or the vegetation effects can be located, the choice of location can help the customer to better preserve the components of the vehicle.

Instead of static building data, the collected data from vehicles that are already parked in this area are evaluated. This crowd solution means that there is no longer a reliance on building maps, which are sometimes not up to date. Additionally, the actual thermal radiation is predicted much more precisely, because, besides the buildings, there is also an influence by vegetation, air flows and temporary shade providers. It is also possible for statements contained in the crowd data to be made for each real vehicle type. The vehicle information number (VIN) allows the vehicle type, paint and the roof type (convertible, panorama glass roof) to be detected and processed in the crowd data as input parameters.

One is therefore independent of a supposedly correct and current building map. According to the invention, it is possible for reflections and wind flows, vegetation, to be taken into consideration and for temporary structures to be taken into consideration. Also, there is less computational complexity than with conventional methods.

According to one aspect of the present invention, the size of a parking area and/or the period are specified during a parking space search. This has the advantage that for example a radius or a city zone can be used to narrow the parking space search. Therefore, not only are individual parking spaces thus selected and analyzed, but rather a variable area can be taken into consideration, depending on the application scenario, and hence the likelihood of finding a suitable parking space can be increased. Further, a navigation system or the automatic derivation from the mobility pattern recognition can be used to set the time frame in which an arrival can be expected and hence to set the period. The period can also be used to set the up-to-dateness of the data.

According to a further aspect of the present invention, the vehicle parameters relate to at least one parked vehicle and/or to a parking vehicle. This has the advantage that vehicle parameters can be taken into consideration for the parking space search and hence it is possible to check which parameters of the parked automobiles are actually relevant to the searching vehicle. Further, it is possible to detect whether a vehicle is parking in the area or whether it is moving therein. Therefore, temperature information and information regarding wind can be interpreted correctly.

According to a further aspect of the present invention, the vehicle parameters describe an electric drive, an internal-combustion-engine-based drive, a state of charge, a fuel reserve, a bodywork design, a vehicle type, an external vehicle color, a vehicle paint, a roof design, a window arrangement and/or a stored vehicle parameter. This has the advantage that the relevant parameters can be read for the applicable application scenario. If primarily the temperature is relevant, then it is possible to detect which vehicle gets particularly hot under insolation, and to take these parameters into consideration. If characteristics are obtained from a window roof, these can likewise be taken into consideration. Generally, automobiles with an open top have different temperature properties than closed vehicles. In the case of an electric drive, the temperature is more important than in the case of an internal-combustion-engine-based drive, since the battery may need to be brought to operating temperature and heating or cooling is even disadvantageous for the range. Especially in the case of an electric vehicle with a low state of charge, it is important to use the air conditioning system as little as possible.

According to a further aspect of the present invention, the parking area information describes a temperature, an insolation angle, an insolation intensity, buildings, a vegetable, air flows, permanent shade providers and/or temporary shade providers. This has the advantage that parameters can be rated independently of one another. As such, for example a panoramic roof is more susceptible to heating of the vehicle than a completely closed roof. It is therefore possible for specifically data from vehicles having a panoramic roof to be evaluated if the vehicle to be parked has a panoramic roof just now. An insolation angle is less relevant to a panoramic roof than to a windshield.

According to a further aspect of the present invention, the parking area information is provided on the basis of optical sensors, temperature sensors, humidity sensors, wind sensors, brightness sensors, received information and/or stored information. This has the advantage that extended capture of the ambient parameters is possible, these not relating to a single parking space, but rather different parameters of an area can be captured.

According to a further aspect of the present invention, the parking vehicles and/or the vehicle to be parked provide a vehicle identifier and/or a vehicle information number VIN. This has the advantage that vehicle information or a vehicle parameter can already be read from such a number. As such, it is possible to detect what design is present and in this case to infer a particular behavior with regard to the parking area information.

According to a further aspect of the present invention, the parking area information is classified on the basis of at least one vehicle parameter, and the parking space is chosen on the basis of the relevant class of the vehicle to be parked. This has the advantage that clustering can be performed and merely relevant information can be processed. Therefore, it is not necessary for every vehicle to be evaluated individually, but rather the searching vehicle can provide its data and receives only parking space information for similar vehicles. As such, a particular size of parking automobiles can be hidden, since in this case there is the risk of a searching vehicle not actually being able to detect such a parking space on account of a lack of size. Therefore, allowance is made for a multiplicity of vehicles providing information on the basis of what is known as the crowd.

The object is also achieved by a parking system for optimum climate conditioning when parking, having a specification unit configured for specifying a parking area and a parking time, wherein the system is characterized in that there is provision for at least one provision unit configured for providing parking area information by means of a plurality of vehicles that are in this parking area in a period that comprises the parking time, and a selection unit configured for selecting a parking space within the parking area on the basis of vehicle parameters.

Therefore, a parking system having a map constructed historically from the crowd with parking position, vehicle orientation and vehicle states (convertible top open, sun visors up, windows open and the like) for forecasting optimum climate conditioning from historic and realtime data (Kalman filter) when parking is proposed.

The object is also achieved by a computer program product having control commands that carry out the method and operate the proposed arrangement or the parking system when they are executed on a computer.

According to the invention, it is particularly advantageous that the method can be used for operating the proposed apparatuses and units. Further, the proposed apparatuses and devices are suitable for carrying out the method according to the invention. Therefore, the respective unit implements structural features suitable for carrying out the applicable method. The structural features can also be in the form of method steps, however. The proposed method also has steps in store for implementing the function of the structural features.

Further advantages, features and details of the invention can be found in the description below, in which aspects of the invention are described in detail with reference to the drawings. In this context, the features mentioned in the claims and in the description can each be essential to the invention individually per se or in any desired combination. Similarly, the features mentioned above and those explained further below can each be used per se or in multiple combinations as desired. Functionally similar or identical parts or components are to a certain extent provided with the same reference signs. The terms "on the left", "on the right", "at the top" "at the bottom" used in the description of the exemplary embodiments relate to the drawings in an orientation with a normally readable designation of the figures or normally readable reference signs. The embodiments shown and described are not intended to be understood as conclusive, but rather have an exemplary nature for explaining the invention. The detailed description serves to inform a person skilled in the art, and therefore known circuits, structures and methods are not shown or explained in detail in the description in order to avoid making the present description more difficult to understand.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
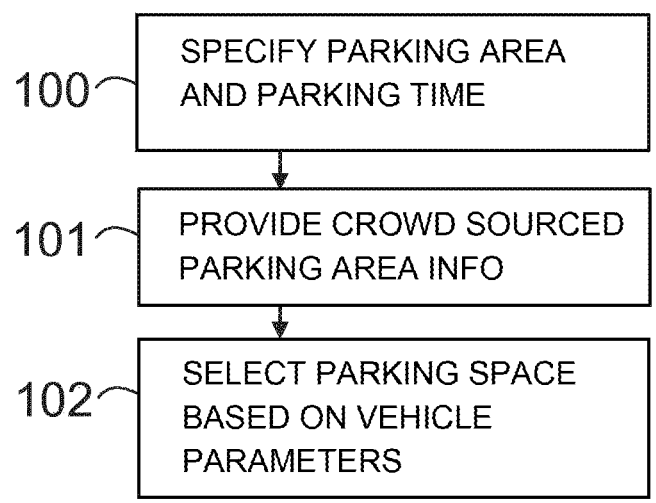
FIG. 1 is a schematic flow chart for a method for optimum climate conditioning when parking according to one aspect of the present invention.

FIG. 1 shows a schematic flowchart for a method for optimum climate conditioning when parking, involving specifying 100 a parking area and a parking time, wherein the method is characterized in that there is provision for providing 101 parking area information by means of a plurality of vehicles that are in this parking area in a period that comprises the parking time, and selecting 102 a parking space within the parking area on the basis of vehicle parameters. The person skilled in the art will recognize in this case that the steps can have further substeps and in particular that the method steps can each be carried out iteratively and/or in a different order.

Figure 2:
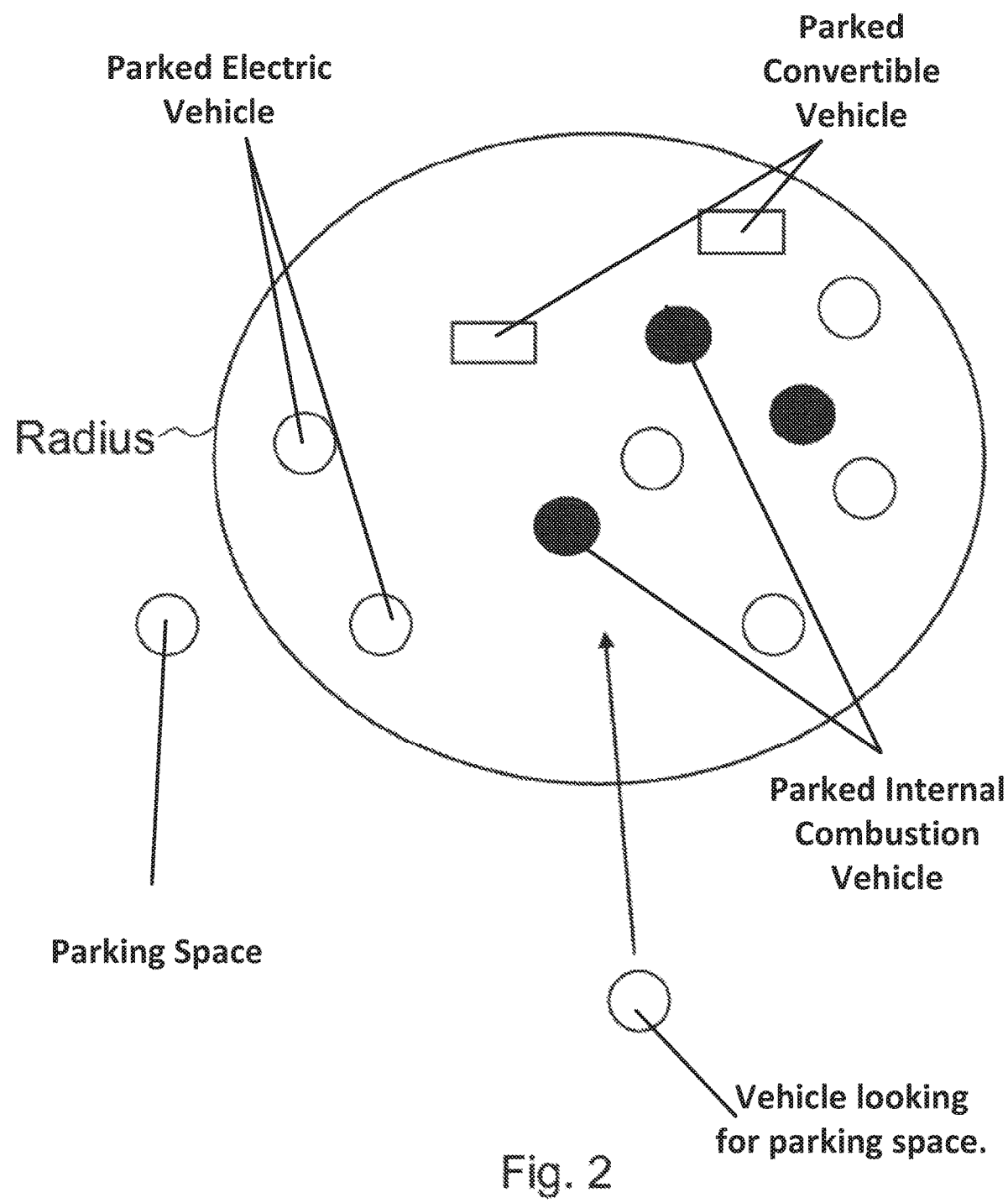
FIG. 2 illustrates a schematic application example of a method for optimum climate conditioning when parking according to a further aspect of the present invention.

FIG. 2 shows, at the bottom, a vehicle looking for a parking space. In this case, the driver assistance system or the driver has specified the radius in which the vehicle is supposed to be parked. Therefore, it is thus also possible to take into consideration those vehicle data that relate only to vehicles that are already parking or have already parked in this area. There is therefore thus no taking account of building maps, but rather actually available values are taken into consideration.

Within the specified area, which is shown by means of the circle in the present case, there are various parking spaces that have different characteristics. On the far left, a parking space is shown that does not need to be taken into consideration in the present case, since it is outside the radius. Since the vehicle shown at the bottom has entered into the navigation system when it will arrive in the parking area, it is now clear which parking space information can be taken into consideration. As such, a period is specified, and that parking space information that is relevant to this period is read.

According to the invention, it is particularly advantageous that the parking area information is provided by a plurality of vehicles that are each different and also provide this distinguishing information. As such, different vehicle types providing the information are shown in the present FIG. 2. As such, for example a vehicle having a white-filled circle can be an electric vehicle. A circle with a black fill can be a vehicle having an internal combustion engine. Further, rectangles are shown, which each describe a convertible.

In the present example, the vehicle now wishes to park in particularly energy-efficient fashion, and therefore that information that relates to a convertible can be hidden. Such convertible vehicles have a different window arrangement and also a top, compared with the electric vehicle looking for a parking space. If a vehicle having an internal combustion engine now provides a parameter of a parking space, it is also just now possible to take into consideration the information that it is an automobile having an internal combustion engine. If an automobile having an internal combustion engine provides a quality value relating to the energy efficiency of the parking space, this value must be rated differently than a value for an electric vehicle. This is the case because, for example, heating of the interior of an electric-motor-driven vehicle must be rated differently than the heating by a vehicle having an internal combustion engine. Further, the electric vehicle looking for a parking space can detect that particular values have been provided by a convertible and hence an inside temperature is not relevant if the top is open.

Therefore, according to the invention, not only is parking area information per se thus provided, but rather the searching vehicle can provide parameters of its own and compare these against parameters of parking automobiles. If, for example, the searching vehicle is a vehicle with bright paintwork, insolation must be rated differently than the influence of insolation on a dark vehicle. Therefore, the searching vehicle can thus take into consideration vehicle properties of its own and merely take into consideration vehicle parameters that have been detected from vehicles in a similar form. Since a multiplicity of vehicles park in a parking area, there are typically always vehicles present that have the same characteristics as the searching vehicle also has. Therefore, quite specific vehicle types can thus be taken into consideration within the parking area and the exact matching data can be found for the searching vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for optimum climate conditioning when parking a vehicle to be parked, the method comprising:
specifying a parking area and a parking time of the vehicle to be parked;
providing parking area information to the vehicle to be parked by way of a plurality of vehicles that are in the parking area in a period that comprises the specified parking time;
receiving first vehicle parameters that describe the vehicle to be parked; receiving second vehicle parameters that describe a parked vehicle of the plurality of vehicles that are in the parking area, the second vehicle parameters of the parked vehicle being associated with the parking area information provided by the parked vehicle;
comparing at least one of the second vehicle parameters of the parked vehicle with at least one of the first vehicle parameters of the vehicle to be parked;
rating a relevance of the parking area information provided by the parked vehicle based on the comparing, such that the parking area information provided by the parked vehicle is of greater relevance when its second vehicle parameters are similar to the first vehicle parameters of the vehicle to be parked; and
selecting a parking space within the parking area based on the relevance.

2. The method according to claim 1, wherein
a size of the parking area and/or a time period of the parking time are specified during a parking space search.

3. The method according to claim 1, further comprising:
determining that certain parking area information is not relevant based on the comparing and the rating; and the selecting of the parking space excludes consideration of the certain parking area information.

4. The method according to claim 1, wherein
the vehicle parameters of the vehicle to be parked and the vehicle parameters of the parked vehicle comprise one or more of:
an electric drive, an internal-combustion-engine-based drive, a state of charge, a fuel reserve, a bodywork design, a vehicle type, an external vehicle color, a vehicle paint, a roof design, a window arrangement and a stored vehicle parameter.

5. The method according to claim 4, wherein
the parking area information comprises one or more of:
a temperature, an insolation angle, an insolation intensity, buildings, a vegetation, air flows, permanent shade providers and temporary shade providers.

6. The method according to claim 5, wherein
the parking area information is provided based on one or more of:
an optical sensor, a temperature sensor, a wind sensor, a brightness sensor, a humidity sensor, received information and stored information.

7. The method according to claim 1, wherein
one or more parking vehicles of the plurality of vehicles and/or the vehicle to be parked provide a vehicle identifier and/or a vehicle information number VIN.

8. The method according to claim 1, wherein
the parking area information is classified based on at least one vehicle parameter, and the parking space is chosen based on a relevant class of the vehicle to be parked.

9. The method according to claim 1, wherein the parking area information comprises one or more of:
a temperature, an insolation angle, an insolation intensity, buildings, a vegetation, air flows, permanent shade providers and temporary shade providers.

10. The method according to claim 1, wherein the parking area information is provided based on one or more of:
an optical sensor, a temperature sensor, a wind sensor, a brightness sensor, a humidity sensor, received information and stored information.

11. A computer product comprising a non-transitory computer readable medium having stored thereon program code operable, when executed by a processor, to:
specify a parking area and a parking time of a vehicle to be parked;
provide parking area information to the vehicle to be parked by way of a plurality of vehicles that are in the parking area in a period that comprises the specified parking time;
receive first vehicle parameters that describe the vehicle to be parked;
receive second vehicle parameters that describe a parked vehicle of the plurality of vehicles that are in the parking area, the second vehicle parameters of the parked vehicle being associated with the parking area information provided by the parked vehicle;
compare at least one of the second vehicle parameters of the parked vehicle with at least one of the first vehicle parameters of the vehicle to be parked;
rate a relevance of the parking area information provided by the parked vehicle based on the comparing such that the parking area information provided by the parked vehicle is of greater relevance when its second vehicle parameters are comparable to the first vehicle parameters of the vehicle to be parked; and
select a parking space within the parking area based on the relevance.

12. The computer program product according to claim 11, wherein
the comparing indicates at least one of the first vehicle parameters of the vehicle to be parked matches at least one of the second vehicle parameters of the parked vehicle that provided the parking area information for which the selection of the parking space is based.

* * * * *